July 24, 1962
N. P. GRELLER
3,045,792
SWITCHING UNIT
Filed Aug. 12, 1958
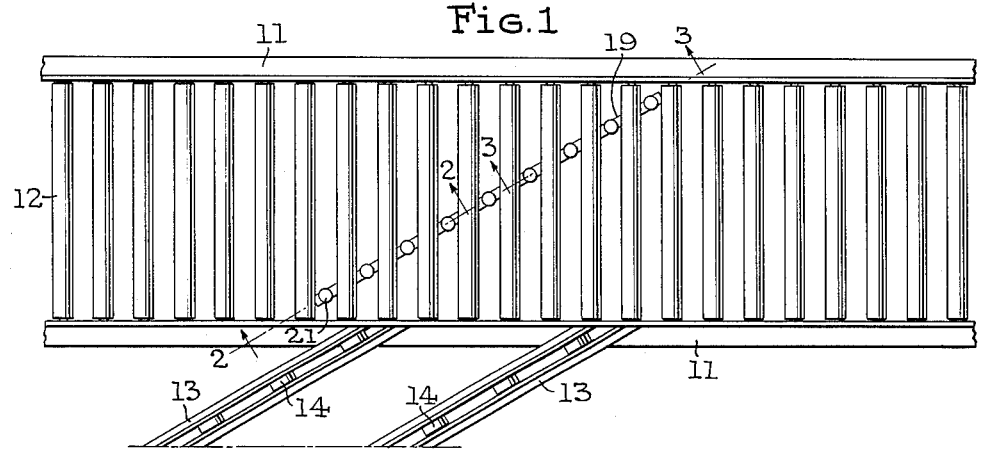
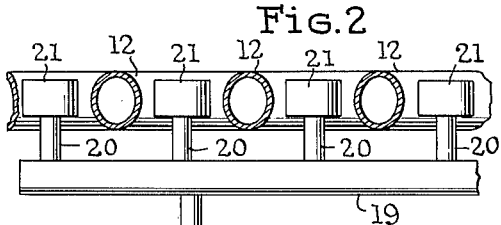
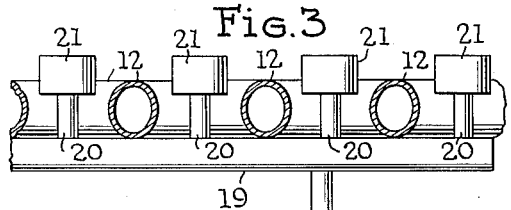
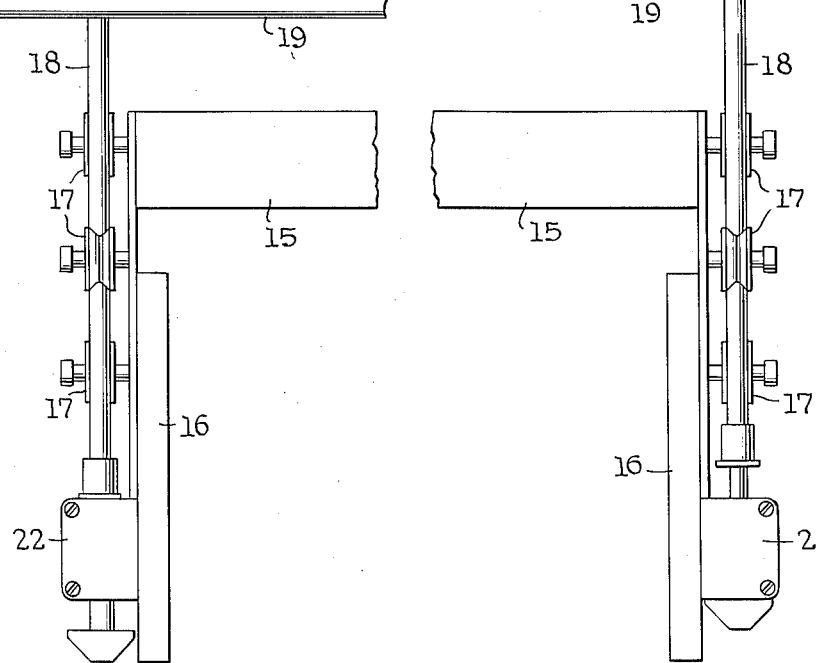
INVENTOR
Nelson P. Greller
BY Dodge and Sons
ATTORNEYS

United States Patent Office 3,045,792
Patented July 24, 1962

3,045,792
SWITCHING UNIT
Nelson P. Greller, 2800 Allendale Place NW.,
Washington, D.C.
Filed Aug. 12, 1958, Ser. No. 754,617
2 Claims. (Cl. 193—36)

This invention relates to means for causing the removal, at a selected removal station, of conveyed articles from a conveyor of the roller type.

A roller conveyor comprises a plurality of horizontally disposed, spaced, parallel-axis rollers. The usual way in which articles are removed from such a conveyor is by hand or by means of a horizontal switch arm arranged to be swung across the conveyor in advance of the package so as to intercept it. Such switches, while satisfactory in many installations, require considerable space in which to swing and time to move from inactive to active position.

According to the present invention, the package removing or diverting means comprises a vertically shiftable carriage extending diagonally across the conveyor beneath its lower surface. This carriage has a plurality of vertical, projecting members spaced along its length and each aligned with the interval between successive conveyor rollers. The carriage may be shifted between upper and lower positions in which the upper ends of the projecting members project above the upper surface of the conveyor or lie beneath that upper surface. In the upper position of the carriage, the conveyed articles will engage the upper ends of the projecting member and will be switched off of the conveyor.

A preferred embodiment of the invention will be described having reference to the accompanying drawing in which:

FIGURE 1 is a top plan view of a portion of a roller conveyor with the invention applied to it.

FIGURE 2 is a fragmentary sectional view on the line 2—2 of FIG. 1 and showing the diverting or switch means in its inactive position.

FIGURE 3 is a fragmentary sectional view on the line 3—3 of FIG. 1 and showing the diverting or switch means in its active position.

The conveyor comprises side frame members 11. Horizontal transverse conveyor rollers 12 extend between members 11. The rollers 12 are journalled on suitable bearings, not shown, which are carried by members 11.

The conveyor surface may be inclined so the packages move thereon by gravity or the rollers may be rotated by a suitable driving means, in which case the conveyor surface may be horizontal or inclined so the conveyed articles move either uphill or downhill. The invention may be used on either type. A gravity type roller conveyor is illustrated in the interests of clarity.

Members 13 are the side frames of a second conveyor onto which the conveyor packages may be switched. The side frames carry a plurality of longitudinally spaced rollers 14. This conveyor might take the form of a chute.

Beneath the conveyor is a guide frame which, as is best shown in FIGURES 2 and 3, comprises a cross-member 15 and upright supports 16 secured to its opposite ends. Each upright support 16 carries three horizontal axis guide rollers 17. A rod 18 is guided by each set of guide rollers, this rod being vertical and engaged on its rear face by two guide rollers 17 and on its front face by one guide roller 17. The upper ends of rods 18 are connected by horizontal carriage 19. A plurality of longitudinally spaced vertical axles 20 projects from the upper face of carriage 19. An article deflecting roller 21 is journalled on each axle.

An actuator such as a solenoid 22 is provided to shift rods 18 up and down between positions in which respectively the diverter is effective to remove packages or ineffective.

As shown in FIG. 1, the carriage 18 is arranged to extend diagonally across and beneath the conveyor, the deflecting rollers 21 being so spaced that each is aligned with a space between successive conveyor rollers 12.

The articles are conveyed from right to left on the conveyor shown in FIGURE 1. In the position shown in FIGURE 2, the rollers 21, carried on carriage 19, lie entirely beneath the conveyor's upper surface. In this position, the packages are conveyed past the removal station without being removed. If, on the other hand, the carriage 19 and rollers 21 are raised, see FIGURE 3, the latter project above the upper surface of the conveyor, the conveyed articles will be engaged by the rollers 21 and continued longitudinal movement will cause lateral displacement of the conveyed article which is switched from the main conveyor onto the rollers 14 of the branching conveyor.

The actuation of solenoids 22 can be controlled manually or by suitable automatic means.

The invention is not limited to use with the precise illustrated apparatus, and no limitation to this apparatus is intended except as may be expressed in the appended claims.

What is claimed is:

1. Switching means, for use in conjunction with a conveyor of the type including a plurality of spaced, transverse, parallel, horizontal axis rollers, comprising in combination a support; a series of upright members projecting upward from said support, said series of members being elements of an imaginary upright surface extending diagonally of the conveyor, each member being aligned with an interval between successive rollers; and means to move said members between an upper position in which they project above the conveyor surface and a lower position in which they are beneath said surface, said members in said upper position being effective to engage an edge surface of a conveyed article whereby said article is switched from said conveyor.

2. The combination defined in claim 1 and a roller member having a vertical axis journalled on the upper end of each projecting member.

References Cited in the file of this patent

UNITED STATES PATENTS

| 600,373 | Newell | Mar. 8, 1898 |
| 1,130,877 | Bernheim | Mar. 9, 1915 |
| 1,351,554 | Cowley | Aug. 31, 1920 |
| 1,905,379 | Gotthardt et al. | Apr. 25, 1933 |
| 2,360,661 | Eddy et al. | Oct. 17, 1944 |
| 2,790,527 | Griffith | Apr. 30, 1957 |
| 2,856,055 | Moss et al. | Oct. 14, 1958 |

FOREIGN PATENTS

| 629,604 | France | Aug. 1, 1927 |